United States Patent
Sutton et al.

(10) Patent No.: US 11,567,983 B2
(45) Date of Patent: *Jan. 31, 2023

(54) DETECTING, CLASSIFYING, AND ENFORCING POLICIES ON SOCIAL NETWORKING ACTIVITY

(71) Applicant: Proofpoint, Inc., Sunnyvale, CA (US)

(72) Inventors: Richard Banks Sutton, San Mateo, CA (US); Anthony Lawrence Dorie, San Francisco, CA (US); Wenchang Yan, Burlingame, CA (US); Devin Hugh Redmond, Encinitas, CA (US); Raymond Kruck, Burlingame, CA (US); Daniel Oshiro Nadir, Carlsbad, CA (US)

(73) Assignee: PROOFPOINT, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,529

(22) Filed: Jun. 14, 2021

(65) Prior Publication Data

US 2021/0303611 A1    Sep. 30, 2021

Related U.S. Application Data

(63) Continuation of application No. 16/730,745, filed on Dec. 30, 2019, now Pat. No. 11,036,778, which is a (Continued)

(51) Int. Cl.
| | |
|---|---|
| *H04L 29/06* | (2006.01) |
| *H04L 29/12* | (2006.01) |
| *H04L 29/08* | (2006.01) |
| *G06F 16/35* | (2019.01) |
| *G06F 16/00* | (2019.01) |
| *G06F 16/958* | (2019.01) |
| *G06F 16/9535* | (2019.01) |
| *H04L 9/40* | (2022.01) |

(Continued)

(52) U.S. Cl.
CPC ............ *G06F 16/353* (2019.01); *G06F 16/00* (2019.01); *G06F 16/122* (2019.01); *G06F 16/958* (2019.01); *G06F 16/9535* (2019.01); *G06Q 50/01* (2013.01); *H04L 63/20* (2013.01)

(58) Field of Classification Search
USPC .................................................. 709/224, 204
See application file for complete search history.

(56) References Cited

U.S. PATENT DOCUMENTS

| | | |
|---|---|---|
| 8,412,770 B2 | 4/2013 | Marcucci |
| 8,621,215 B1 | 12/2013 | Iyer |

(Continued)

OTHER PUBLICATIONS

Notice of Allowance for U.S. Appl. No. 16/681,486, dated Oct. 6, 2021, 7 pgs.

(Continued)

*Primary Examiner* — Jude Jean Gilles
(74) *Attorney, Agent, or Firm* — Sprinkle IP Law Group (57) ABSTRACT

Technology is disclosed for detecting, classifying, and/or enforcing policies on social networking activity. The technology can store a content policy, classify content posted to a social network, determine that the classification corresponds to the content policy, and apply an action specified by the content policy to the posted content.

20 Claims, 5 Drawing Sheets

Related U.S. Application Data continuation of application No. 15/218,817, filed on Jul. 25, 2016, now Pat. No. 10,528,611, which is a continuation of application No. 13/844,178, filed on Mar. 15, 2013, now Pat. No. 9,400,999.

(51) Int. Cl.
*G06F 16/11* (2019.01)
*G06Q 50/00* (2012.01)

(56) References Cited

U.S. PATENT DOCUMENTS

| | | | |
|---|---|---|---|
| 8,668,590 | B2 | 3/2014 | Barclay |
| 8,788,442 | B1 | 7/2014 | Sculley, II et al. |
| 9,037,653 | B2 | 5/2015 | Wiseman |
| 9,043,417 | B1 | 5/2015 | Jones et al. |
| 9,105,039 | B2 | 8/2015 | Kramer |
| 9,118,689 | B1 | 8/2015 | Apte |
| 9,262,610 | B2 | 2/2016 | Lessin et al. |
| 9,286,378 | B1 | 3/2016 | Zarakhovsky |
| 9,369,433 | B1 | 6/2016 | Paul et al. |
| 9,400,999 | B2 * | 7/2016 | Sutton ............... G06F 16/00 |
| 10,033,684 | B2 | 7/2018 | Sutton |
| 10,511,562 | B2 | 12/2019 | Sutton |
| 10,528,611 | B2 * | 1/2020 | Sutton ............... G06F 16/122 |
| 11,036,778 | B2 * | 6/2021 | Sutton ............... G06F 16/353 |
| 2002/0178155 | A1 | 11/2002 | Sakurai |
| 2007/0190504 | A1 | 8/2007 | Schwartz |
| 2008/0033776 | A1 * | 2/2008 | Marchese ........... G06Q 20/10 705/37 |
| 2008/0189380 | A1 | 8/2008 | Bosworth |
| 2009/0171723 | A1 * | 7/2009 | Jenkins ............... G06Q 10/10 705/38 |
| 2010/0153175 | A1 | 6/2010 | Pearson et al. |
| 2011/0052019 | A1 | 3/2011 | Moshe |
| 2011/0113096 | A1 | 5/2011 | Long |
| 2011/0161419 | A1 * | 6/2011 | Chunilal ........... G06Q 30/0249 709/204 |
| 2011/0208822 | A1 * | 8/2011 | Rathod ............... G06Q 30/02 709/206 |
| 2011/0213646 | A1 | 9/2011 | Ali |
| 2011/0213716 | A1 * | 9/2011 | Ocko ................... A63F 13/75 705/304 |
| 2011/0276513 | A1 | 11/2011 | Erhart et al. |
| 2011/0321132 | A1 | 12/2011 | Slingerland |
| 2012/0066259 | A1 | 3/2012 | Huber |
| 2012/0089451 | A1 | 4/2012 | Agramonte |
| 2012/0124202 | A1 | 5/2012 | Cooper |
| 2012/0150772 | A1 | 6/2012 | Paek |
| 2012/0221962 | A1 * | 8/2012 | Lew ................... H04W 4/21 715/752 |
| 2012/0233265 | A1 | 9/2012 | Joy |
| 2012/0239486 | A1 | 9/2012 | Hu |
| 2013/0018965 | A1 | 1/2013 | Ramanchandran |
| 2013/0046826 | A1 | 2/2013 | Stanton |
| 2013/0060864 | A1 | 3/2013 | Ehms |
| 2013/0086641 | A1 | 4/2013 | Mehr |
| 2013/0139224 | A1 | 5/2013 | Wehmeier et al. |
| 2013/0198275 | A1 | 8/2013 | Forsblom |
| 2013/0263206 | A1 | 10/2013 | Nefedov |
| 2014/0012738 | A1 | 1/2014 | Woo |
| 2014/0040170 | A1 | 2/2014 | Zheng et al. |
| 2014/0108946 | A1 | 4/2014 | Olofsson |
| 2014/0115181 | A1 | 4/2014 | Wu |
| 2014/0136492 | A1 | 5/2014 | Lerios |
| 2019/0124109 | A1 | 4/2019 | Foster |
| 2020/0084174 | A1 | 3/2020 | Sutton |
| 2020/0133969 | A1 | 4/2020 | Sutton |

OTHER PUBLICATIONS

Office Action for U.S. Appl. No. 13/844,178, dated Jan. 14, 2015, 9 pgs.
Office Action for U.S. Appl. No. 13/844,178, dated Sep. 25, 2015, 11 pgs.
Office Action for U.S. Appl. No. 14/306,098, dated Aug. 9, 2016, 17 pgs.
Office Action for U.S. Appl. No. 14/306,098, dated Apr. 28, 2017, 16 pgs.
Office Action for U.S. Appl. No. 14/306,098, dated Sep. 27, 2017, 18 pgs.
International Search Report and Written Opinion for International Patent Application No. PCT/US2017/036594, dated Sep. 1, 2017, 7 pgs.
Office Action for U.S. Appl. No. 16/019,428, dated Oct. 18, 2018, 6 pgs.
Office Action for U.S. Appl. No. 15/218,817, dated Apr. 12, 2019, 9 pgs.
Office Action for U.S. Appl. No. 16/730,745, dated Aug. 19, 2020, 6 pgs.
Notice of Allowance for U.S. Appl. No. 16/730,745, dated Feb. 18, 2021, 5 pgs.

* cited by examiner

FIG. 1

Content Categories 200

SECURITY

▼ Criminal & Illegal — 204
    Criminal Activity — [Log ▾]
    Hacking — [Log ▾]
    Illegal Drugs — [Notify ▾]
    Illegal Software — [Delete ▾]

▸ Security & Spam — [Delete ▾] 206

COMPLIANCE

▸ Regulations & Compliance — [Log ▾] 208

ACCEPTABLE USE

▸ Abuse, Hate & Intolerance — [Delete ▾]
▸ Adult — [Log ▾]
▸ Controversial Topics — [Log ▾] — 210
▸ Education Compliance — [Log ▾]
▸ Pornography — [Delete ▾]

OTHER

▸ Entertainment — [Log ▾] 212

DETECTING, CLASSIFYING, AND ENFORCING POLICIES ON SOCIAL NETWORKING ACTIVITY

CROSS-REFERENCE TO RELATED APPLICATIONS

This application is a continuation of, and claims a benefit of priority under 35 U.S.C. § 120 from, U.S. patent application Ser. No. 16/730,745, filed Dec. 30, 2019, issued as U.S. Pat. No. 11,036,778, entitled "DETECTING, CLASSIFYING, AND ENFORCING POLICIES ON SOCIAL NETWORKING ACTIVITY," which is a continuation of, and claims a benefit of priority under 35 U.S.C. § 120 from, U.S. patent application Ser. No. 15/218,817, filed Jul. 25, 2016, issued as U.S. Pat. No. 10,528,611, entitled "DETECTING, CLASSIFYING, AND ENFORCING POLICIES ON SOCIAL NETWORKING ACTIVITY," which is a continuation of, and claims a benefit of priority from, U.S. patent application Ser. No. 13/844,178, filed Mar. 15, 2013, issued as U.S. Pat. No. 9,400,999, entitled "DETECTING, CLASSIFYING, AND ENFORCING POLICIES ON SOCIAL NETWORKING ACTIVITY," all of which are hereby incorporated by reference in their entireties.

BACKGROUND

Social networking platforms and networks, including, e.g., FACEBOOK, GOOGLE+, LINKEDIN, TWITTER, YOUTUBE, XING, and many others, are commonly employed by millions of users. They have become so pervasive that they are now commonly used even by organizations and other commercial enterprises to advertise as well as to communicate with their target audiences on behalf of the organizations. (The social networking platforms named in this application may be registered or common law trademarks of entities unrelated to the applicant. Applicant makes no claim of ownership over any such trademarks.)

A social account (or simply "account") is an account on one or more such social networking platform(s) ("social network"). An account can be associated with an individual (e.g., a natural person) or it can be associated with an organization (e.g., created by an employee of the organization) for broadcasting information about the organization or its products or services. Creating accounts on these social networks is relatively simple and users can create a "presence" on the social networks for themselves, their products, their brands and/or their initiatives. Organizations can grant, to people and applications administrative, access to one or more of their social accounts. These social accounts and the activity on them become very valuable forums for communicating with audiences of the organization including, e.g., employees, potential employees, influencers, prospective customers, and customers. Organizations have learned that ensuring the integrity of the content of these accounts is as important as protecting the integrity of the content published on their website.

Social networks generally have application programmatic interfaces ("APIs") that enable third party applications ("social applications" or simply "applications") to integrate with the social networks and provide additional services for the social networks' users. Many social applications provide publishing services that enable users to concurrently publish content across multiple social networks. Many of these social applications for publishing also have APIs that enable third party integration.

Many organizations attempt to enforce written Acceptable Use Policies (AUPs) that define what, how, and where employees may communicate with the company's customers in their roles as representatives of the company and its brands. Companies attempt to enforce their AUPs across all communication channels. However, enforcement can often be difficult.

DETAILED DESCRIPTION

The disclosed technology detects, classifies, and enforces policies on application and content activity on social networking accounts, e.g., accounts managed by a brand or organization ("managed social accounts") across disparate social application platforms and social networks ("the technology"). In various embodiments, the technology can provide pre-defined and custom detection and policy categories ("categories") for application types, lexical data types, full uniform resource locators ("URLs"), shortened URLs, source types, user types, and digital image types, along with policy action rules ("action rules") including, e.g., ignore, log, archive, notify, quarantine, remediate, delete, and block. The technology is capable of taking these actions without any further input from a user. The technology enables organizations that have multiple social accounts across many social networking platforms to define parameters for what constitutes "appropriate content" (e.g., as outlined in their AUPs) and enforce that set of rules consistently across all social networking platforms on which the organization participates, without having to create a set of rules for each social networking platform on which they have a social account.

In various embodiments, the technology provides a user interface that enables a user to specify a set of rules that govern types of content that can be published (or "posted"). Published content can include content of any type, e.g., originally posted content, responses or comments from other users, uploaded images or multimedia content, etc. The rules together form a "policy." The policy governs metadata of the content or aspects of the content itself, including, e.g.: (a) the social applications that can be used to publish the content; (b) lexical categorization of words that comprise the content (for example: profanity, hate speech, political speech, unprofessional speech, etc.); (c) categorization of URLs embedded in the content (for example: links that lead to malicious, spam or pornographic web sites), including URLs shortened by using a URL shortening service; (d) categorization of the image or video types embedded in the content; (e) natural language classification of the words that comprise the content to determine if they represent a breach of the regulatory obligations of the company (FINRA, HIPAA, PII, etc.); (f) geolocation of the user who is publishing the content at the time the content is published, or geolocation of a place that the content refers to; (g) specific terms or regular expression patterns specified by the user; and (h) the device used to publish the content (e.g., mobile phones, tablets, laptops, etc.).

In various embodiments, the technology may need to collect account authorization information for each social network that is to be managed, e.g., so that the technology can log in to the social networks, use APIs offered by social networks (or content publishing tools), etc.

In various embodiments, policies can be predefined, e.g., so that a user associated with a particular organization can simply specify the type of organization with which the user is associated. The predefined policies may specify default actions, but the policies may be fine-tuned by the user. As an example, a bank may require different policies than a technology company. The bank may need to comply with regulatory issues but the technology company may just be focused on its brand.

The policies can vary across organizations, users, publishing tools, geographical location, time of day, user device, etc. As an example, a policy may specify that one user is allowed to post some types of content but not other types of content. A policy may specify that a particular publishing tool can be used but not others. A policy can specify that a particular policy is to be applied for users in one geographical region and a different policy for users in a different region. A policy can specify that some types of content can be published using a particular tool during a specified time period. A policy can specify that some types of content cannot be posted using a mobile computing device. The technology is thus able to work with a wide set of types of policies and the circumstances surrounding their application. These can be treated as policy attributes and a policy can comprise multiple policy attributes, thereby forming compound policies. As an example of a compound policy, a user can specify that a post can be published if the user uses an approved publishing tool and the post occurs within the hours of 9:00 am and 5:00 pm on a weekday. The technology can treat compound policies as a single policy.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Figure 1:
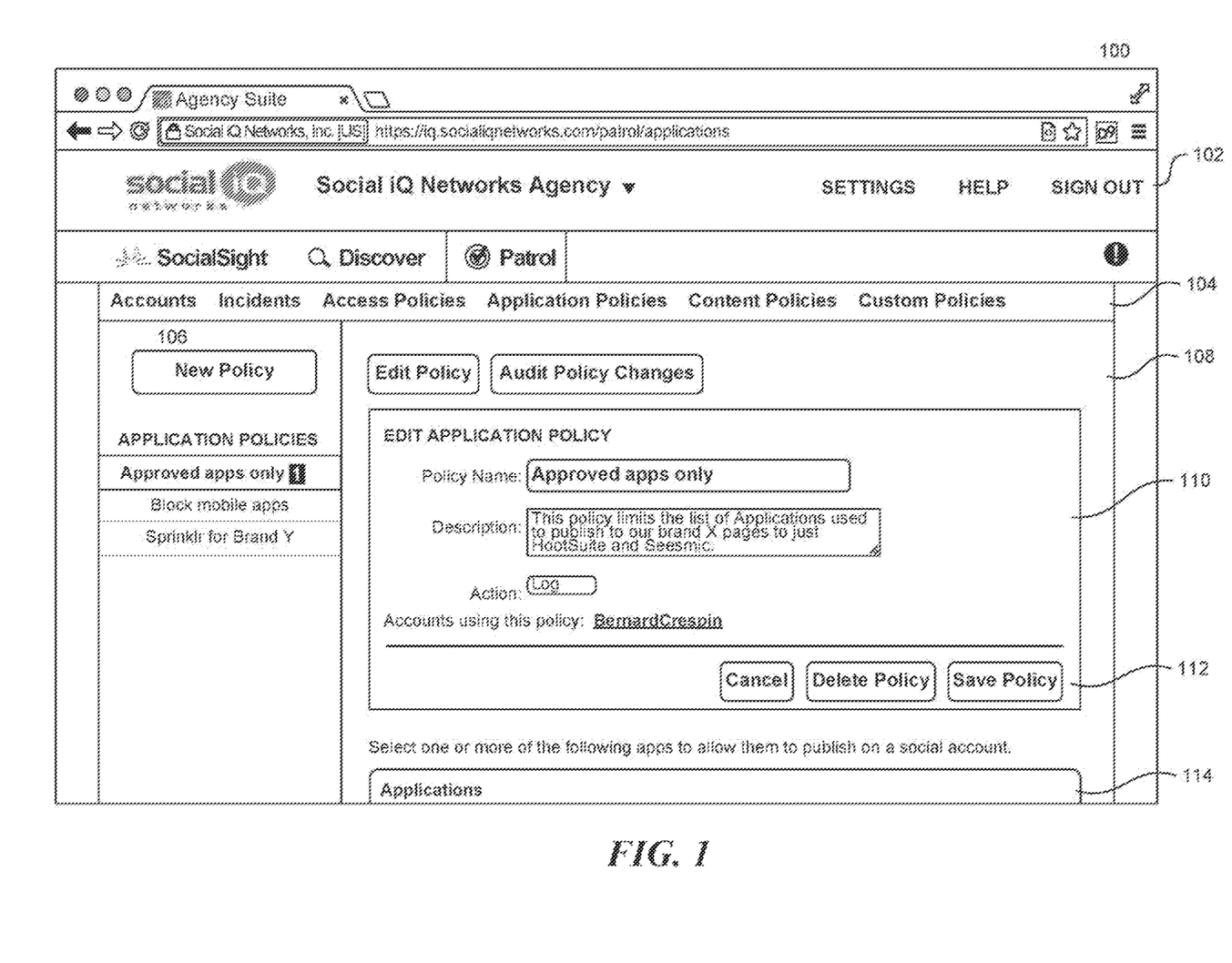
FIG. 1 is a user interface diagram illustrating a user interface employed by the technology in various embodiments.

FIG. 1 is a user interface diagram illustrating a user interface 100 employed by the technology in various embodiments. The user interface 100 can be presented in a Web browser, standalone application, applet, etc. The user interface 100 includes a region 102 that a user can use, e.g., to sign in or sign out of the user interface 100 associated with the technology. After a user has signed in, the technology enables the user to view social accounts the user can manage, view incident reports (e.g., violations of policies), manage access policies, manage social application policies, manage content policies, and manage other policies ("custom policies"), e.g., by selecting links in a links region 104. The user can create a new policy by selecting a new policy region 106. The user can enter details about the new policy or manage an existing policy by selecting options in region 108. The user can provide details about the policy, e.g., the policy name, its description, etc., in region 110. The user can delete policies, or save the newly created policy or changes to existing policy by selecting options in region 112. The user can publish to a social network using the accounts associated with the user by selecting options in region 114 (not fully illustrated).

Figure 2:
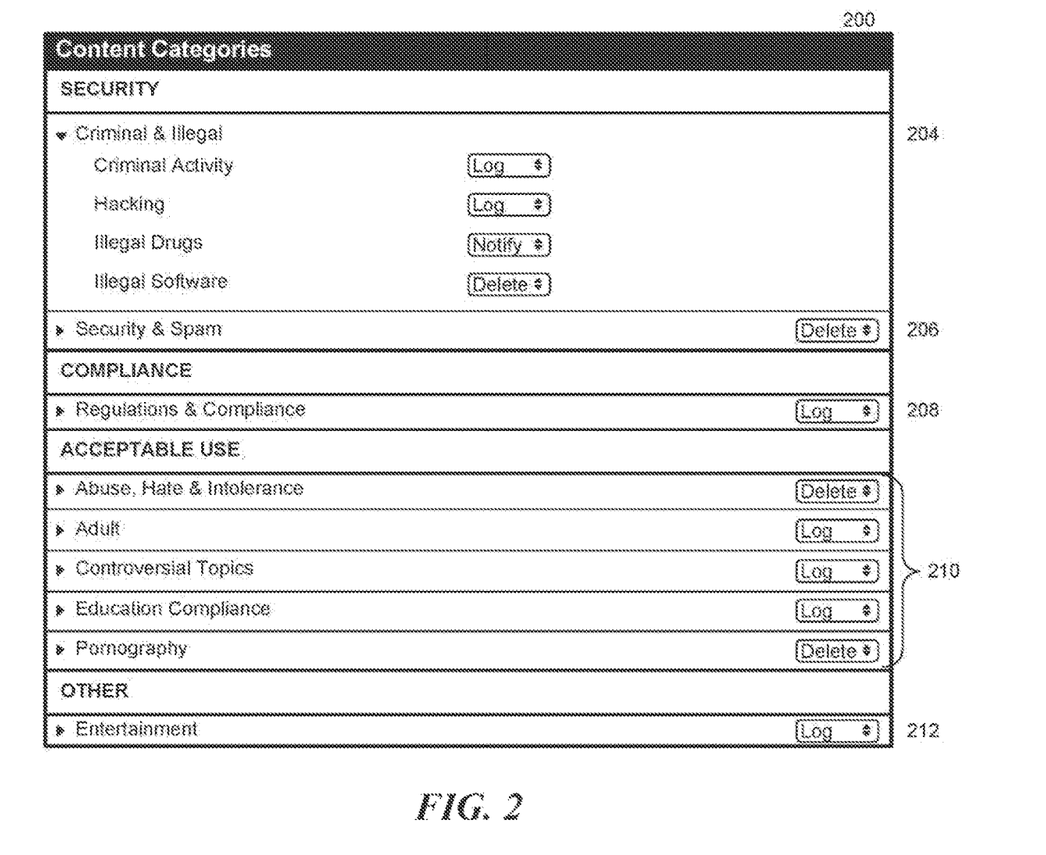
FIG. 2 is a user interface diagram illustrating a user interface employed by the technology in various embodiments.

FIG. 2 is a user interface diagram illustrating a user interface 200 employed by the technology in various embodiments. Using the illustrated user-interface 200, a user can identify actions to be performed when the technology detects a violation of one or more rules associated with a policy. The actions can include, e.g., (a) notifying the user or a set of users via an email, text message or other form of electronic communication; (b) creating a record of the violation in a database for a user to look at later; (c) removing the content from its corresponding social network if it is found after it has been published; and (d) preventing the content from being published to any social networks if the content is found before it is published. The user-interface 200 can include a first security region 204 to identify actions to be performed when the technology detects criminal and/or illegal activity and a second security region 206 to identify actions to be performed when the technology detects "spam" or other specified security activity. In various embodiments, a set of default actions may be associated with, e.g., a type of organization that the user is associated with. The user can then fine-tune the default actions by using the illustrated options. As an example, the user-interface 200 can include a compliance region 208 to enable a user at an organization that has specific regulatory compliance issues to fine tune a default selection. The user-interface 200 also includes an acceptable use region 210 to enable the user to modify selections for content. The user-interface 200 can also include an "other" region 212, e.g., to control content not associated with the previously identified regions.

In various embodiments, categories of policies can be grouped so that, for example, a single policy action can apply to all members of the group.

Figure 3:
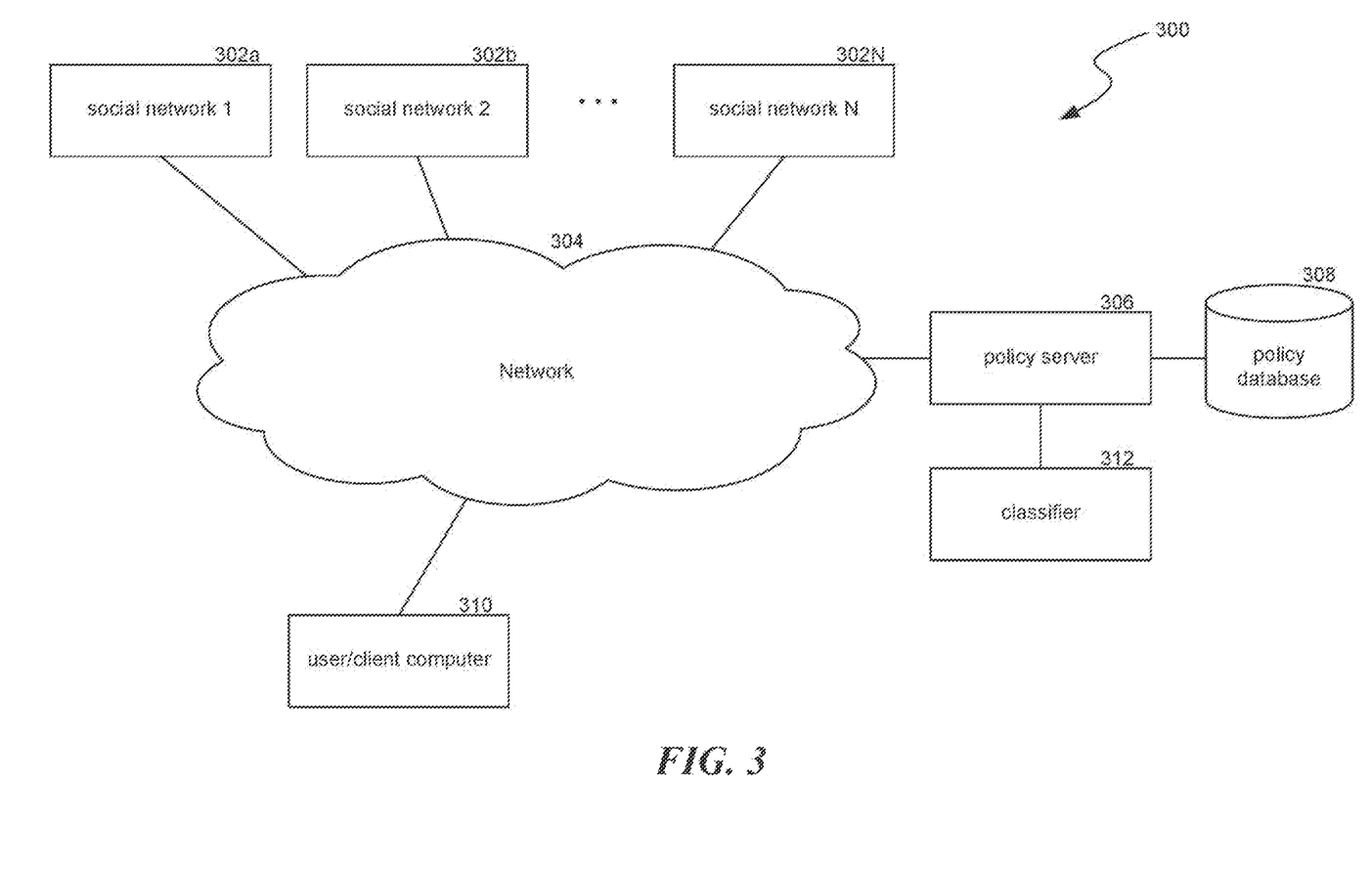
FIG. 3 is a block diagram illustrating an environment in which the technology may operate in various embodiments.

After the user has specified (or revised) actions, the technology stores the content rules and associated actions as a "policy" into a policy database. A policy database can be stored in a database management system, file system, or indeed any other type of data storage medium. FIG. 3 is a block diagram illustrating an environment 300 in which the technology may operate in various embodiments. The environment 300 can include one or more social networks, e.g., social network 1 302A, social network 2 302B, and social network 3 302N. The social networks may be communicatively coupled via a network 304 (e.g., an intranet, the Internet, etc.) with a policy server 306 associated with the technology and one or more client computing devices 310. The policy server 306 may have associated with it a policy database 308, e.g., to store policies, and a classifier 312 to classify content. The classifier 312 may classify text, images, multimedia, etc. One skilled in the art will recognize that policy database 308 can store information in various data formats.

Figure 4A:
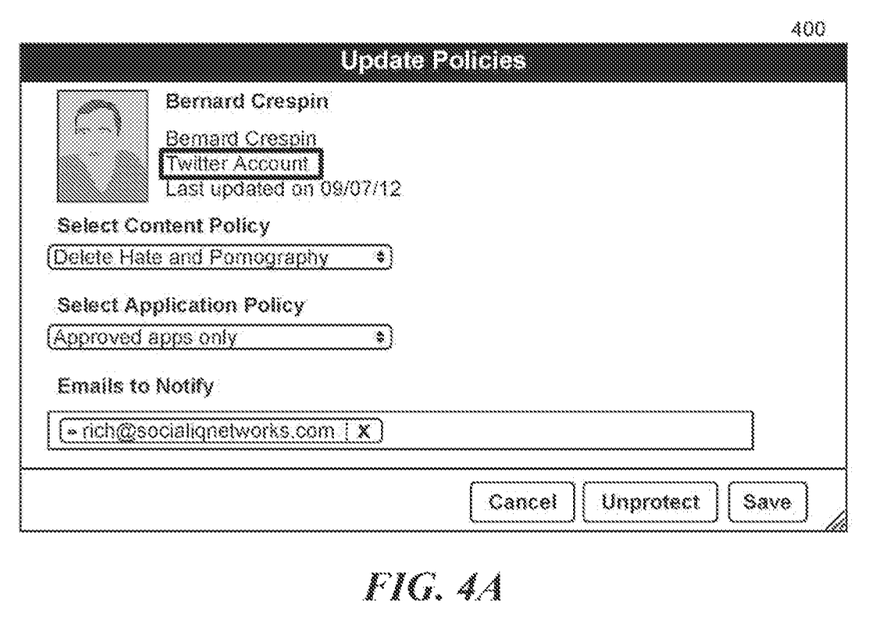
FIGS. 4A and 4B are user interface diagrams illustrating user interfaces for enabling users to specify a set of social accounts onto which content rules will be applied in various embodiments.
Figure 4B:
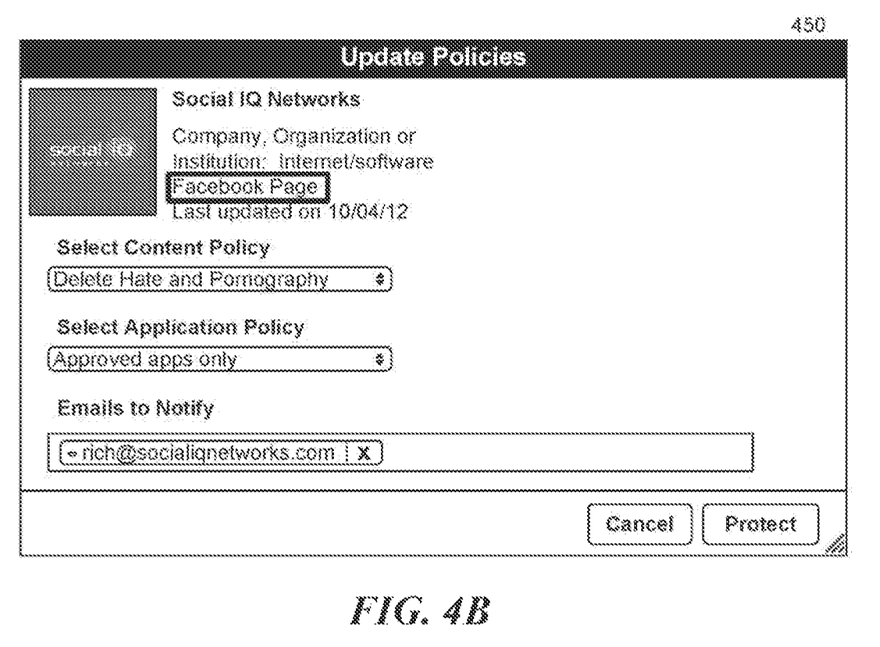

FIGS. 4A and 4B are user interface diagrams illustrating user interfaces 400 and 450, respectively, for enabling users to specify a set of social accounts onto which content rules will be applied in various embodiments. The social accounts can be from any social networking platform and are defined as a set separately from the rules that combine to form a policy as described above. User interface 400 illustrates that a user can select that hate and pornography content is to be deleted and that only approved applications can be used to post information to a specified TWITTER account. When the policy is violated, an email message will be sent to a specified email account to notify the user of that email account. Similarly, user interface 450 illustrates a similar policy for a specified FACEBOOK page.

Figure 5:
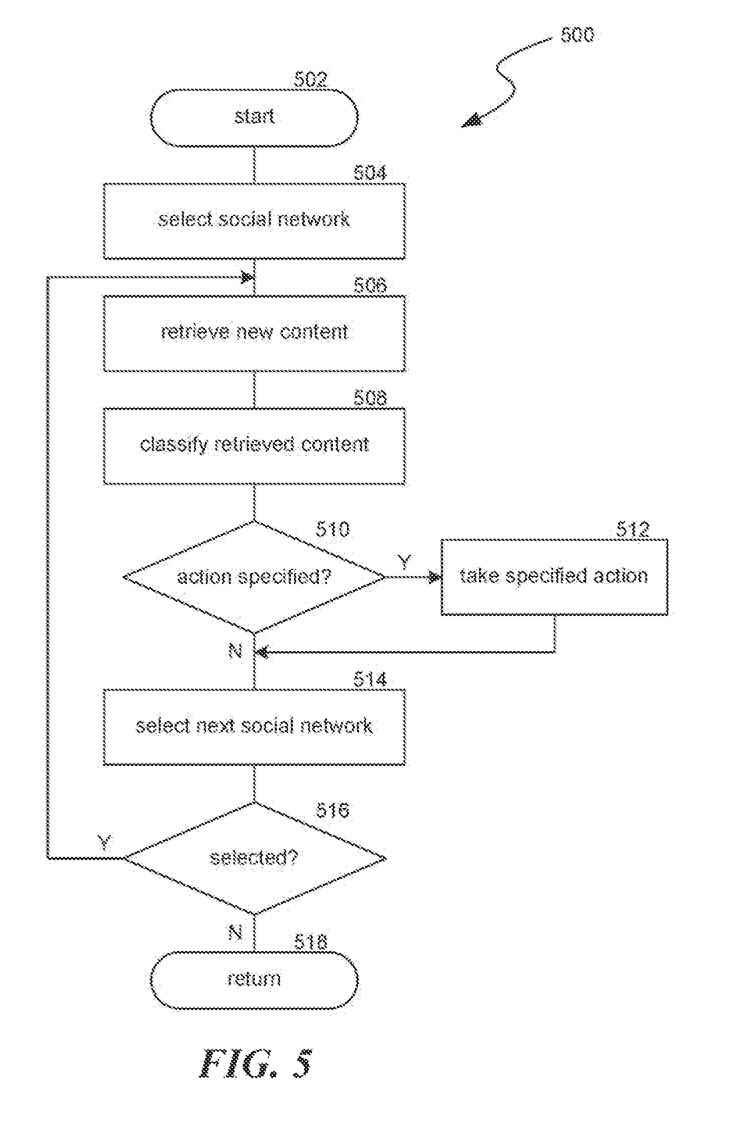
FIG. 5 is a flow diagram illustrating a routine invoked by the technology in various embodiments to classify postings made to a social network and take actions on the postings consistent with a specified policy.

FIG. 5 is a flow diagram illustrating a routine 500 invoked by the technology in various embodiments to classify postings made to a social network and take actions on the postings consistent with a specified policy. The routine begins at block 502. At block 504, the routine selects a social network, e.g., from a list of social networks associated with an account or user that is presently employing on whose behalf the technology is presently operating. At block 506, the routine retrieves new content from the selected social network, e.g., content that may have been added since the last time the technology checked the selected social network. At block 508, the routine classifies the retrieved content. As an example, the routine may classify the retrieved content as pornographic, violating a particular regulation, etc. Various technologies can be employed for classifying content, e.g., text analysis, image analysis, etc. At decision block 510, the routine determines whether an action is specified for the classification. As an example, if a policy is associated with the classification, the policy may indicate an action. If an action is specified, the routine continues at block 512. Otherwise, the routine continues at block 514. At block 512, the technology takes the specified action. As an example, the specified action may be to alert a user or delete the content. After taking the action, the routine continues at block 514. At block 514, the routine selects another social network. At decision block 516, the routine determines whether another social network was selected. If another social network was selected, the routine returns to block 506. Otherwise, if all social networks have been processed, the routine returns at block 518. The routine may be invoked at regular time intervals, random time intervals, upon detection that content has been uploaded to a social network or is about to be uploaded to a social network, etc. In various embodiments, the routine invokes APIs relating to the social networks or APIs relating to content publication tools. In various embodiments, the technology and the routine may be invoked by social networks or content publication tools, e.g., as part of an extension provided by the social networks or publication tools.

Those skilled in the art will appreciate that the logic illustrated in FIG. 5 and described above may be altered in a variety of ways. For example, the order of the logic may be rearranged, substeps may be performed in parallel, illustrated logic may be omitted, other logic may be included, etc.

In various embodiments, the technology detects, classifies, and/or enforces policies on social networking activity by storing a content policy; classifying content posted to a first social network; determining that the classification corresponds to the content policy; and applying an action specified by the content policy to the posted content. The action can be to delete the content without user input. The classifying, determining, and applying can be done on content posted to a second social network. The policy can be stored only once for both the first and the second social networks. The classifying can occur before the content is posted to the first social network and/or after the content is posted to the second social network.

In various embodiments, the technology can provide various reports or "views" of policy actions taken. As examples, the technology can produce reports showing incidences of the technology ignoring, logging, archiving, notifying, quarantining, causing to remediate, deleting, or blocking content. The reports can be selectively generated, e.g., for specific users, accounts, actions, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing device to detect, classify, or enforce policies on social networking activity, the method comprising:
    classifying content posted from a managed social account to a plurality of accounts across disparate social networking platforms, wherein the classifying comprises:
        performing at least one of a text analysis, an image analysis, or a multimedia analysis of the content; and
        generating a classification of the content based on the at least one of the text analysis, the image analysis, or the multimedia analysis of the content;
    determining a content policy based at least on the classification of the content from the classifying, the content policy stored in a policy database accessible by the computing device;
    determining whether the content policy has been violated;
    determining whether the content policy specifies an action when the content policy is violated; and
    responsive to the content policy having been violated and the content policy specifying what action to take when the content policy is violated, taking the action with respect to the content without user input.

2. The method according to claim 1, wherein the action comprises deleting the content from the plurality of accounts across the disparate social networking platforms.

3. The method according to claim 1, wherein the action comprises notifying a user of the managed social account.

4. The method according to claim 1, wherein the action comprises generating an email message and sending the email message to a specified email account associated with a user of the managed social account.

5. The method according to claim 1, further comprising:
    selecting a social network from a list of social networks associated with the managed social account or a user of the computing device;
    determining new content added to the social network since last time the computing device checked the social network;
    retrieving the new content from the social network; and
    classifying the new content, the classifying including performing at least one of the text analysis, the image analysis, or the multimedia analysis of the new content.

6. The method according to claim 5, further comprising:

determining, based on a classification of the new content from the classifying, whether the classification of the new content has an associated policy;
responsive to the classification of the new content having an associated policy, determining whether the associated policy indicates an action; and
responsive to the associated policy indicating an action, taking the action with respect to the new content.

7. The method according to claim 5, further comprising:
invoking the selecting at a regular time interval, at a random time interval, or upon detection that the new content has been uploaded or is about to be uploaded to the social network.

8. A system, comprising:
a processor;
a non-transitory computer-readable medium; and
instructions stored on the non-transitory computer-readable medium and translatable by the processor for:
    classifying content posted from a managed social account to a plurality of accounts across disparate social networking platforms, wherein the classifying comprises:
        performing at least one of a text analysis, an image analysis, or a multimedia analysis of the content; and
        generating a classification of the content based on the at least one of the text analysis, the image analysis, or the multimedia analysis of the content;
    determining a content policy based at least on the classification of the content from the classifying, the content policy stored in a policy database;
    determining whether the content policy has been violated;
    determining whether the content policy specifies an action when the content policy is violated; and
    responsive to the content policy having been violated and the content policy specifying what action to take when the content policy is violated, taking the action with respect to the content without user input.

9. The system of claim 8, wherein the action comprises deleting the content from the plurality of accounts across the disparate social networking platforms.

10. The system of claim 8, wherein the action comprises notifying a user of the managed social account.

11. The system of claim 8, wherein the action comprises generating an email message and sending the email message to a specified email account associated with a user of the managed social account.

12. The system of claim 8, wherein the instructions are further translatable by the processor for:
selecting a social network from a list of social networks associated with the managed social account or a user of the system;
determining new content added to the social network since last time the system checked the social network;
retrieving the new content from the social network; and
classifying the new content, the classifying including performing at least one of the text analysis, the image analysis, or the multimedia analysis of the new content.

13. The system of claim 12, wherein the instructions are further translatable by the processor for:
determining, based on a classification of the new content from the classifying, whether the classification of the new content has an associated policy;
responsive to the classification of the new content having an associated policy, determining whether the associated policy indicates an action; and
responsive to the associated policy indicating an action, taking the action with respect to the new content.

14. The system of claim 12, wherein the instructions are further translatable by the processor for:
invoking the selecting at a regular time interval, at a random time interval, or upon detection that the new content has been uploaded or is about to be uploaded to the social network.

15. A computer program product comprising a non-transitory computer-readable medium storing instructions translatable by a processor of a system for:
classifying content posted from a managed social account to a plurality of accounts across disparate social networking platforms, wherein the classifying comprises:
    performing at least one of a text analysis, an image analysis, or a multimedia analysis of the content; and
    generating a classification of the content based on the at least one of the text analysis, the image analysis, or the multimedia analysis of the content;
determining a content policy based at least on the classification of the content from the classifying, the content policy stored in a policy database;
determining whether the content policy has been violated;
determining whether the content policy specifies an action when the content policy is violated; and
responsive to the content policy having been violated and the content policy specifying what action to take when the content policy is violated, taking the action with respect to the content without user input.

16. The computer program product of claim 15, wherein the action comprises deleting the content from the plurality of accounts across the disparate social networking platforms.

17. The computer program product of claim 15, wherein the action comprises notifying a user of the managed social account.

18. The computer program product of claim 15, wherein the action comprises generating an email message and sending the email message to a specified email account associated with a user of the managed social account.

19. The computer program product of claim 15, wherein the instructions are further translatable by the processor for:
selecting a social network from a list of social networks associated with the managed social account or a user of the system;
determining new content added to the social network since last time the system checked the social network, wherein the selecting is invoked at a regular time interval, at a random time interval, or upon detection that the new content has been uploaded or is about to be uploaded to the social network;
retrieving the new content from the social network; and
classifying the new content, the classifying including performing at least one of the text analysis, the image analysis, or the multimedia analysis of the new content.

20. The computer program product of claim 19, wherein the instructions are further translatable by the processor for:
determining, based on a classification of the new content from the classifying, whether the classification of the new content has an associated policy;
responsive to the classification of the new content having an associated policy, determining whether the associated policy indicates an action; and
responsive to the associated policy indicating an action, taking the action with respect to the new content.

* * * * *